Patented Apr. 6, 1954

2,674,634

UNITED STATES PATENT OFFICE 2,674,634

HYDROGENATION OF POLYUNSATURATED COMPOUNDS

Bernard S. Greensfelder and Robert J. Moore, Oakland, Calif., assignors to Shell Development Company, San Francisco, Calif., a corporation of Delaware No Drawing. Application August 5, 1950, Serial No. 177,964

10 Claims. (Cl. 260—666)

This invention relates to the production of mono-olefinic compounds. It deals with the conversion of carbon compounds having a plurality of olefinic and/or acetylenic bonds to the corresponding mono-olefinic compounds by partial hydrogenation. It is especially concerned with an improved method of carrying out conversions of this type more efficiently and economically without substantial production of saturated compounds. An advantageous feature of the invention is that by its use relatively pure individual mono-olefinic compounds can be produced without expensive purification from the corresponding compounds having a plurality of multiple linkages.

A great deal of work has been done in an effort to find an effective method for the selective hydrogenation of compounds having a plurality of multiple linkages to produce mono-olefinic compounds. Most of this work, as described in "Chemical Reviews," volume 31, pages 143 to 159 (August, 1942), has been carried out with metal or metal oxide catalysts, and it has been found that there is usually only a relatively small difference in reactivity between the starting unsaturated compound and the corresponding mono-olefinic compound. As a result, the reaction had to be mechanically interrupted in order to obtain partial hydrogenation, and even then it was usually difficult to isolate the intermediate mono-olefin in satisfactory yield. Furthermore, it is very difficult to hydrogenate olefinic compounds with these catalysts in the presence of common sulfur compounds except for some limited special cases involving thiophenes. However, one catalyst, namely, nickel sulfide, is known to be highly selective for the hydrogenation of polyolefinic compounds to mono-olefinic compounds without substantial formation of saturated compounds. Nickel sulfide has been thought to be unique in this respect, but another catalyst has now been found which not only is much more active than nickel sulfide for the hydrogenation of polyunsaturated compounds to mono-olefins but also is virtually inactive for hydrogenation of mono-olefinic compounds or aromatic rings. This catalyst is a molybdenum sulfide which is truly selective in that the rate of mono-olefin hydrogenation is so low as to be negligible under liquid phase hydrogenation conditions. Besides showing very high selectivity, these catalysts have a high tolerance for sulfur compounds so that impurities, such as mercaptans, alkyl sulfides, etc., in the polyunsaturated compound to be hydrogenated can be tolerated in amounts of 1% or more without loss of activity. Furthermore, the molybdenum sulfide catalysts used in the new process are very stable and can be re-used repeatedly without apparent loss of activity due to structural changes. In contrast, nickel sulfide is not stable in the presence of hydrogen at the temperatures used, and it gradually loses activity on use.

In the process of the invention it is desirable to use molybdenum sulfide catalysts having an atomic ratio of sulfur to molybdenum of approximately 2, it having been found that sulfides of molybdenum wherein this atomic ratio is higher are much less active. Thus, freshly sulfided molybdenum catalyst has a sulfur to molybdenum ratio of close to 3 and is not active below a temperature of 140° C., whereas a similar catalyst with a composition corresponding to $MoS_2$ is active for the hydrogenation of diolefins at temperatures as low as 100° C. and the rate of hydrogenation gradually increases with increasing temperature. While various methods may be used to prepare molybdenum sulfide catalysts having the desired composition and activity, a particularly advantageous procedure comprises a two-step method in which a higher molybdenum sulfide is first prepared and this sulfide then reduced, preferably by heating in a stream of hydrogen, to form molybdenum disulfide. Most preferably, a support for the molybdenum sulfide catalyst is used. The use of a suitable support is especially desirable in liquid phase selective hydrogenation of diolefins in accordance with the invention since in this method of operation the carrier is not only advantageous in promoting higher hydrogenation rates but also may serve to reduce the bulk density of the catalyst below that of the pure molybdenum sulfide and thus assist its dispersion in the liquid phase.

A particularly useful support material is alumina, especially activated aluminas of high specific surface, preferably having a surface area of 300 square meters per gram or more. Suitable aluminas may be prepared from natural bauxite or may be synthetically produced and are commercially available so their manufacture need not be described. U. S. Patents 2,449,295, 2,454,227 and 2,478,675, for example, described advantageous methods of producing alumina catalyst carriers. Aloxite and alundum are other forms of alumina which may be employed as the carrier. Promoters for the alumina, for instance, silica, preferably present in an amount of about 5%, are advantageous. Treatment of the alumina carrier with acid, for example, hydrogen chloride, hydrogen fluoride or sulfuric acid, or an acid salt such as zinc chloride, aluminum chloride and the like, is often advantageous in the preparation of molybdenum sulfide-alumina catalysts. Instead of alumina, or in conjunction therewith, one may use other suitable support materials such, for instance, as silica gel, pumice, diatomite, Vicor glass, activated charcoal, activated (acid-treated) clays such as Filtrol, silica-alumina complexes, for instance, such as described in U. S. Patents 2,438,379 and 2,469,314, etc., as the carrier for the molybdenum sulfide.

More active catalysts are obtained by carrying out the sulfiding step on powdered, rather than ordinary granular, support material. As a rule, it is advantageous to impregnate the chosen support material in granular form, for example, about 6–20 mesh, with a suitable readily decomposable molybdenum compound such, for instance, as ammonium molybdate, and, after drying, grind the impregnated granules to pass a 100-mesh screen. The sulfiding can then be efficiently carried out with the powder in a fluidized state using any of the usual systems for reaction in the presence of a fluidized solid. A fluidized fixed bed reactor which has been found to be especially suitable comprises a tubular, heated reaction section having a height to internal diameter ratio of about 10:1 to 12:1, where the powdered catalyst is violently agitated by the passing gas, surmounted by a disengaging section of three times the diameter of the reaction section. In a reactor of these approximate proportions a linear gas velocity of the order of about 3 feet per second serves to maintain the alumina-based catalysts satisfactorily fluidized during sulfiding. By providing below the tubular section a conical section having a height about 40% of the tubular section and tapering to a diameter about half of that of the tubular section, the necessary linear gas velocity for satisfactory fluidization was found to be reduced by about 50% when the sulfiding gas was introduced through the long conical section. Most preferably, the sulfiding is carried out with hydrogen sulfide at a temperature of 250° C. to about 450° C., using a sulfiding time of about 3 to 5 hours, but lower or higher temperatures below 550° C. may be used with approximately longer or shorter sulfiding times sufficient to give a catalyst surface which is substantially completely molybdenum sulfide.

In the preparation of the preferred catalysts for selective hydrogenation according to the invention, the initially produced higher sulfides of molybdenum are converted to molybdenum disulfide. One effective method of carrying out such conversions to the more active disulfide is by reduction with hydrogen. A reduction temperature of at least about 200° C. is desirable but the temperature should be below the sintering temperatures which are of the order of 550° C. or above. About one hour with hydrogen at 300° C. has been found to be effective. Instead of reduction with hydrogen, thermal decomposition of the trisulfide in an inert atmosphere of, for instance, helium or nitrogen, can be used. It is also feasible, although usually less desirable, to carry out the removal of the excess sulfur from molybdenum sulfide catalysts having a sulfur to molybdenum ratio greater than 2:1 simultaneously with the selective hydrogenation process, a loss of initial hydrogenation plant capacity and contamination of the product by the resultant hydrogen sulfide being disadvantages of this procedure. Still other methods of molybdenum disulfide production including special methods for the direct formation of the disulfide without going through the higher sulfides may also be used in preparing catalysts useful in the new hydrogenation process, although these procedures usually involve difficult control problems. The most desirable catalysts, however, are produced as previously indicated by reduction with hydrogen to the disulfide of higher molybdenum sulfide catalysts prepared by sulfiding in a fluidized state.

As previously indicated, the selective hydrogenation process of the invention is carried out with special advantage under liquid phase hydrogenation conditions using molybdenum disulfide on a carrier, preferably an activated alumina carrier. Depending upon the polyolefinic compound being hydrogenated, atmospheric or, more preferably, superatmospheric pressure of the order of about 100 to 3000 p. s. i. g. is used. It is a feature of the invention that low temperatures ordinarily of about 100° C. to about 200° C. are employed. A large excess of hydrogen over the stoichiometric requirement for the desired selective hydrogenation is advantageous and can be safely used because of the high selectivity of the molybdenum sulfide catalyst employed. The hydrogenation may be carried out batchwise in agitated autoclave-type reactors, or continuously by passing the polyolefinic compound with suspended catalyst and hydrogen through heated tubes or other forms of reactors in which sufficient time of contact under hydrogenating conditions is provided to effect the desired selective hydrogenation to the corresponding mono-olefinic compound.

The following examples illustrate some typical applications of the process of the invention in one of its preferred modifications.

*Example I*

A number of different polyolefinic hydrocarbons were subjected to hydrogenation in a stainless steel agitated reactor of the type described by Adkins in "Industrial and Engineering Chemistry, Analytical Edition," volume 4, page 342 (1942). The polyolefinic hydrocarbon, together with about five times its volume of a saturated liquid hydrocarbon solvent and about 50 parts of molybdenum disulfide on alumina catalyst per 100 to 150 parts of hydrocarbon, was charged to the reactor, and, after flushing out the air with hydrogen, hydrogen was admitted until the pressure reached 1500 p. s. i. g. The reactor was then heated to the reaction temperature of 150° C., usually within 40 minutes. When hydrogen was no longer absorbed as determined from observation of the pressure drop, the reactor was cooled, the excess hydrogen released, and the product recovered by distillation from the solvent after removal of the catalyst by filtration.

The catalyst used was prepared by impregnating a commercial granular alumina catalyst carrier containing about 5% silica with sufficient ammonium molybdate solution to produce a catalyst containing about 10% by weight of molybdenum. After drying at 130° C., the catalyst was ground to pass 100 mesh and sulfided by treatment with hydrogen sulfide, and then reduced with hydrogen in a fluidized fixed-bed treater of the type previously described. In all cases the active catalyst was molybdenum disulfide formed by reduction of the initially produced higher molybdenum sulfide. Loss of catalytic activity during hydrogenation, characterized by a gradual lowering of the hydrogenation rate, was not observed with the molybdenum disulfide-alumina catalysts, in contrast to the results with nickel sulfide catalysts under similar conditions. A plot of pressure drop versus time for the molybdenum disulfide catalysts gave a straight line to a point corresponding to absorption of about one mole of hydrogen for each double bond greater than one in the starting polyolefinic hydrocarbon when a relatively sharp discontinuity occured and no more absorption of hydrogen was observed. The following are typical of the results which have been obtained:

| Polyolefinic Hydrocarbon | Moles Hydrogen/ Mole Hydrocarbon Required for Complete Saturation | Moles Hydrogen Absorbed/ Mole Hydrocarbon | Moles Olefinic Bonds Reduced/ Mole Hydrocarbon Charged, by Br. No. |
|---|---|---|---|
| Limonene | 2 | 1.0 | 1.0 |
| 1,5-Hexadiene | 2 | 1.0 | 1.0 |
| Myrcene | 3 | 1.9 | 1.8 |
| 1,3-Cyclohexadiene | 2 | 1.0 | 1.0 |
| 2-Pentene | 1 | nil | none |
| 1-Hexene | 1 | nil | none |
| Cyclohexene | 1 | 0.05 | 0.05 |
| Benzene | 3 | nil |  |

These results show the high selectivity of the molybdenum sulfide catalyst for hydrogenation of polyolefins to mono-olefins and its virtual inactivity for hydrogenation of mono-olefins or aromatic rings under the applied conditions. In this connection it should be pointed out that the small amount of hydrogenation of cyclohexene which occurred required 24 hours' reaction time at 150° C., whereas the diolefins were hydrogenated to mono-olefins in an hour or less under the same conditions.

Experiments have established that the hydrogenation proceeds through the conjugated form of the polyolefin, with preliminary isomerization of non-conjugated double bonds to the conjugated form unless such isomerization is not structurally possible, as in the case of 1,3,4-trimethyl-4-propenylcyclohexene-1, which was found not to absorb hydrogen under the foregoing conditions. The selective hydrogenation has been found, however, to be generally applicable to any polyolefinic hydrocarbon having at least one pair of double bonds which are conjugated or which are linked together by one or more carbon atoms, none of which is directly attached to more than three carbon atoms.

Example II

The superiority of molybdenum disulfide catalysts in the selective hydrogenation of polyolefins is shown by the following results for the rates of hydrogenation of d-limonene with various metal sulfide catalysts, all prepared as in Example I with the same alumina support. In all cases the hydrogenations were carried out in the apparatus used in Example I employing a temperature of 150° C. and an initial hydrogen pressure of 1500 p. s. i. g.

| Catalyst | Hydrogenation Rate (moles per hour) |
|---|---|
| $MoS_2$ | 1.06 |
| NiS | 0.44 |
| FeS | 0.04 |
| $WS_2$ | nil |

From these results it can be seen that, with molydenum disulfide as catalyst, plant capacity can be increased two and one-half times over that obtainable with the best of the other catalysts. Furthermore, the molybdenum disulfide catalyst is more stable and retains its high activity for longer periods than the other catalysts.

Example III

The advantages of sulfiding the catalyst in a fluidized condition are shown by the following tests. Catalysts were prepared by impregnating dried 8-14 mesh granular alumina with ammonium molybdate solution so the catalyst would contain about 10% molybdenum. In one case the impregnated alumina was sulfided directly with hydrogen sulfide for four hours at 300° C. and then ground to pass 100 mesh. In the other case the impregnated alumina was ground to pass 100 mesh and then sulfided under the same conditions in a fluidized fixed-bed treater. Results for a number of comparative hydrogenation runs with a mixture of equal volumes of di-limonene and n-heptane at 150° C. and 1000 p. s. i. g. initial hydrogen pressure were:

| Form of Catalyst During Sulfiding | Relative Hydrogenation Rate | Br. No. of Product |
|---|---|---|
| Granules | 1,620 | 61.6 |
| Powder | 2,400 | 61.9 |

Example IV

A gamma-alumina xerogel containing 5% to 6% silica as the carrier gives more active molybdenum disulfide catalysts than other types of alumina, as shown by the following results of comparative tests of catalysts prepared with such a carrier and with an alpha-alumina monohydrate (böhmite) carrier and used in the hydrogenation of d-limonene. In both cases the catalysts were prepared by sulfiding the powdered impregnated support ground to pass 100 mesh. The hydrogenation was carried out at 150° C. with an initial hydrogen pressure of 1000 p. s. i. g.

| Type of Alumina Support | Realtive Hydrogenation Rate |
|---|---|
| Gamma-alumina xerogel with 5% to 6% silica | 2,410 |
| Alpha-alumina monohydrate | 1,730 |

Other polyolefinic hydrocarbons which may be similarly converted to the corresponding mono-olefins are, for example, the hexadienes, isoprene, piperylene, cyclohexadiene, methylcyclohexadiene, dipentene, terpinene, etc. Compounds having an acetylenic group and an olefinic group in the molecule, such as vinyl acetylene and the like, may similarly be used as starting material for the preparation of mono-olefins according to the invention. The invention is not restricted to the treatment of hydrocarbons alone, but may be applied to the partial saturation of substitution products thereof having a plurality of ethylenic and/or acetylenic groups in the molecule, such, for example, as polyolefinic acids, alcohols, esters, ethers, ketones, aldehydes, amines, nitro compounds, halides, sulfides, mercaptans, etc. The substituent groups or elements present may be inert under the reaction conditions or may be such as to undergo simultaneous change without interfering with the partial hydrogenation of the unsaturated bonds present. Thus, the invention can be advantageously used to reduce the unsaturation of drying oils while avoiding formation of completely saturated products. Sorbic acid can be converted to 3-hexenoic acid; geraniol can be hydrogenated to obtain the corresponding decylenol; isobutenyl isobutyl ketone can be produced from phorone; and ethyl thiophene from vinyl thiophene. Butadienyl acetate, for example, is typical of another type of substituted starting material which can be used in the process. In the same way, by use of the new method, styrene can be selectively hydrogenated to ethyl benzene, alpha-propenyl benzene can be converted to propyl benzene, and indane can be produced selectively from indene.

Still other variations may be made in the process of the invention which is not limited to the examples described by way of illustration nor by any theory proposed in explanation of the improved results obtained.

We claim as our invention:

1. A process for producing an olefinic compound from a more highly unsaturated compound having a plurality of pairs of carbon atoms directly linked by multiple bonds in which no carbon atom intervening between said multiple bonds is directly attached to more than three carbon atoms, said highly unsaturated compound being selected from the group consisting of polyolefinic, olefinic-acetylenic and polyacetylenic compounds, which comprises reacting said more highly unsaturated compound with hydrogen in the presence of a catalyst consisting essentially of molybdenum sulfide having an atomic ratio of sulfur to molybdenum of 2:1 as the sole effective catalyst.

2. A process for substantially completely converting a polyolefinic hydrocarbon having a plurality of pairs of carbon atoms directly linked by double bonds, which pairs of carbon atoms form at least a part of a carbon chain in which no carbon atom intervening between said double bonds is directly attached to more than three carbon atoms, to the corresponding mono-olefinic hydrocarbon without appreciable formation of saturated hydrocarbon therefrom, which comprises reacting said polyolefinic hydrocarbon with hydrogen in the presence of a molybdenum sulfide catalyst having an atomic ratio of sulfur to molybdenum of 2:1 as the sole effective catalyst.

3. A process for producing a mono-olefin from a polyolefinic hydrocarbon having a pair of conjugated double bonds therein to the substantial exclusion of saturated hydrocarbon production, which comprises reacting said polyolefinic hydrocarbon in the liquid phase with hydrogen in the presence of a molybdenum sulfide catalyst having an atomic ratio of sulfur to molybdenum of 2:1 as the sole effective catalyst.

4. A process for producing a mono-olefin from a conjugated diolefin to the substantial exclusion of the corresponding saturated product of hydrogenation, which comprises reacting said diolefin in the liquid phase with hydrogen at a temperature of 100° C. to 200° C. in the presence of a molybdenum sulfide catalyst having an atomic ratio of sulfur to molybdenum of 2:1 as the sole effective catalyst.

5. A process for producing a mono-olefinic hydrocarbon from a corresponding diolefinic hydrocarbon wherein the olefinic double bonds are in conjugated relation to each other under the reaction conditions without substantial production of the corresponding saturated hydrocarbon, which comprises reacting said diolefinic hydrocarbon in the liquid phase at 100° C. to 200° C. and 100 to 3000 p. s. i. g. pressure in the presence of a catalyst consisting essentially of molybdenum sulfide having an atomic ratio of sulfur to molybdenum of 2 to 1 as the sole effective catalyst.

6. A process for producing a mono-olefinic hydrocarbon from a polyolefinic hydrocarbon having a pair of olefinic double bonds which undergo isomerization to the conjugated form under the reaction conditions, which comprises reacting said polyolefinic hydrocarbon in the liquid phase at 100° C. to 200° C. and 100 to 3000 p. s. i. g. pressure in the presence of a catalyst consisting essentially of molybdenum sulfide having an atomic ratio of sulfur to molybdenum of 2 to 1 as the sole effective catalyst.

7. A process for converting a polyolefinic hydrocarbon having in the molecule a pair of olefinic double bonds which are in conjugated relation to each other under the reaction conditions to a more highly saturated olefinic hydrocarbon without saturated hydrocarbon formation, which comprises reacting said polyolefinic hydrocarbon with hydrogen in the presence of a catalyst consisting essentially of molybdenum disulfide having an atomic ratio of sulfur to molybdenum of 2:1 and being the sole effective catalyst, said catalyst being formed by reduction of a higher molybdenum sulfide.

8. A process for producing a mono-olefinic hydrocarbon from a corresponding diolefinic hydrocarbon wherein the olefinic double bonds are in conjugated relation to each other under the reaction conditions without substantial production of the corresponding saturated hydrocarbon, which comprises reacting said diolefinic hydrocarbon in the liquid phase in the presence of a catalyst consisting essentially of molybdenum disulfide on activated alumina, said catalyst having an atomic ratio of sulfur to molybdenum of 2:1, being the sole effective catalyst and being formed by reducing with hydrogen a higher sulfide of molybdenum produced by sulfiding in the fluidized state alumina impregnated with molybdenum.

9. A process in accordance with claim 8 in which the hydrogenation of the diolefinic hydrocarbon is conducted at a temperature of 100° C. to 200° C.

10. A process for converting a polyolefinic hydrocarbon having in the molecule a pair of olefinic double bonds which are in conjugated relation to each other under the reaction conditions to a more highly saturated olefinic hydrocarbon without saturated hydrocarbon formation, which comprises reacting said polyolefinic hydrocarbon with hydrogen in the presence of a catalyst consisting essentially of molybdenum disulfide-alumina, the sole effective catalyst, formed by impregnating granules of a gamma-alumina xerogel containing 5% to 6% of silica with a readily decomposable molybdenum compound, grinding the impregnated granules to a powder which will pass 100 mesh, reacting the powder in a fluidized state with hydrogen sulfide at 250° C. to 450° C. to substantially completely convert the molybdenum to molybdenum sulfide having an atomic ratio of sulfur to molybdenum greater than 2 to 1, and reducing said molybdenum sulfide by reaction with hydrogen to molybdenum disulfide having an atomic ratio of sulfur to molybdenum of 2:1.

References Cited in the file of this patent

UNITED STATES PATENTS

| Number | Name | Date |
| --- | --- | --- |
| 2,123,623 | Brown | July 12, 1938 |
| 2,479,435 | Vesterdal | Aug. 16, 1949 |

FOREIGN PATENTS

| Number | Country | Date |
| --- | --- | --- |
| 589,915 | Great Britain | July 3, 1947 |